(12) United States Patent
Suzuki

(10) Patent No.: US 7,106,396 B2
(45) Date of Patent: Sep. 12, 2006

(54) DISPLAY UNIT AND ELECTRONIC APPARATUS INCLUDING A BACKLIGHT DISPOSED BETWEEN TWO DISPLAY SURFACES

(75) Inventor: Nobutaka Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/678,185

(22) Filed: Oct. 6, 2003

(65) Prior Publication Data

US 2005/0041179 A1    Feb. 24, 2005

(30) Foreign Application Priority Data

Oct. 24, 2002  (JP)  ............... 2002-309581
Jul. 16, 2003  (JP)  ............... 2003-198130

(51) Int. Cl.
*G02F 1/1347*    (2006.01)
*G02F 1/1335*    (2006.01)

(52) U.S. Cl. ............... 349/74; 349/62; 349/98; 349/113; 349/115

(58) Field of Classification Search ........... 349/74, 349/61, 62, 96, 98, 113, 115
See application file for complete search history.

(56) References Cited

U.S. PATENT DOCUMENTS

| | | | | |
|---|---|---|---|---|
| 5,592,314 | A | * | 1/1997 | Ogasawara et al. ........... 349/18 |
| 5,686,979 | A | * | 11/1997 | Weber et al. ........... 349/96 |
| 5,742,367 | A | * | 4/1998 | Kozaki ........... 349/64 |
| 6,741,301 | B1 | | 5/2004 | Tsuji |
| 6,773,766 | B1 | * | 8/2004 | Meyer et al. ........... 428/1.1 |
| 6,847,427 | B1 | * | 1/2005 | Yamauchi ........... 349/113 |
| 6,897,914 | B1 | * | 5/2005 | Yoshida ........... 349/65 |
| 2002/0126468 | A1 | * | 9/2002 | Umemoto et al. ........... 362/26 |
| 2003/0165060 | A1 | * | 9/2003 | Ouderkirk et al. ........... 362/297 |
| 2004/0100598 | A1 | * | 5/2004 | Adachi et al. ........... 349/113 |
| 2005/0073627 | A1 | | 4/2005 | Akiyama |

FOREIGN PATENT DOCUMENTS

| | | |
|---|---|---|
| EP | 1-217-422 | 6/2002 |
| JP | A-6-250169 | 9/1994 |
| JP | 09-189811 | * 7/1997 |
| JP | A 10-90678 | 4/1998 |
| JP | A-10-293212 | 11/1998 |
| JP | A 2000-75815 | 3/2000 |
| JP | A 2001-290445 | 10/2001 |
| JP | A-2001-318374 | 11/2001 |
| JP | A-2002-182199 | 6/2002 |
| JP | A-2002-189230 | 7/2002 |
| JP | A-2004-4462 | 1/2004 |
| KR | B1-10-0248586 | 3/2000 |
| KR | A-2002-0056893 | 10/2002 |
| KR | A-2003-0084744 | 11/2003 |
| KR | A-2003-0091744 | 12/2003 |
| WO | WO 03/029884 A1 | 4/2003 |

* cited by examiner

*Primary Examiner*—Tarifur R. Chowdhury
(74) *Attorney, Agent, or Firm*—Oliff & Berridge, PLC

(57) ABSTRACT

To provide a display device that can display images on both the front and the rear surfaces and that can display images brightly without increasing the electrical power consumption.

A liquid crystal device 100 includes two liquid crystal cells 10 and 20, a backlight 40, which is interposed between the two liquid crystal cells 10 and 20 and which can emit light to the liquid crystal cells 10 and 20, and two reflective polarizers 31 and 32 interposed between the backlight 40 and each of the liquid crystal cells 10 and 20, respectively.

10 Claims, 8 Drawing Sheets

DISPLAY UNIT AND ELECTRONIC APPARATUS INCLUDING A BACKLIGHT DISPOSED BETWEEN TWO DISPLAY SURFACES

BACKGROUND OF THE INVENTION

1. Field of Invention

The present invention relates to a display unit and an electronic apparatus. More specifically, the invention relates to a display unit that can display images on both the front and the rear surfaces.

2. Description of Related Art

The related art includes display units that have a backlight as a light source interposed between two liquid crystal panels and that display images on both the front and the rear surfaces. These related art display units are disclosed in Japanese Unexamined Patent Application Publication No. 10-90678, and Japanese Unexamined Patent Application Publication No. 2001-290445.

SUMMARY OF THE INVENTION

For the above display unit, a polarizer is disposed between each of the two liquid crystal panels and the light source, allowing only light polarized in a predetermined direction to enter the display panels. In this case, light polarized in a direction that does not match the direction of the polarization axis (the transmissive axis) of the polarizer is absorbed by the polarizers. For this reason, the amount of light that may be used for the display is greatly reduced, causing the display to become dark. Therefore, to obtain a bright display, it is necessary to use a brighter light source. As a result, the electrical power consumption increases.

The present invention provides a display unit that displays images on both the front and the rear surfaces, while addressing or solving the above, by effectively using the backlight to offer a bright display without causing an increase in the electrical power consumption. The invention also provides an electronic apparatus that includes this display unit.

To address or achieve the above, the display unit according to the present invention includes two transmissive polarization axis rotating devices to vary the polarization axis of the transmitted light, an illumination device that emits light to each of the transmissive polarization axis rotating devices and that is disposed between the two transmissive polarization axis rotating devices, and two reflective polarized light selecting devices, each disposed between the illumination device and each of the two transmissive polarization axis rotating devices. The illumination device transmits the reflected light from the two reflective polarized light selecting devices.

In such display unit, among the light emitted from the illumination device, only the transmitted light (first polarized light) selectively transmitted through the reflective polarized light selecting devices (first reflective polarized light selecting device) enters the transmissive polarization axis rotating devices. On the other hand, the reflected light (second polarized light) polarized in a predetermined direction at the first reflective polarized light selecting device enters the reflective polarized light selecting devices on the opposite side (second reflective polarized light selecting device) via the illumination device. By selectively transmitting the reflected light through the second reflective polarized light selecting device, the reflected light may enter the transmissive polarization axis rotating devices on the opposite side. More specifically, by configuring the second reflective polarized light selecting device so that it transmits the second polarized light while reflecting the first polarized light, the polarized light reflected at one of the reflective polarized light selecting devices is selectively transmitted through the other reflective polarized light selecting device. Then this polarized light enters the transmissive polarization axis rotating devices and may be selectively emitted to the outside from the transmissive polarization axis rotating devices, allowing the light emitted from the illumination device to be used for display without any loss. Thus, for this display unit, which may display images on the front and the rear surfaces, a bright display may be obtained by effectively using the light without causing an increase in the electrical power consumption. The reflective polarized light selecting devices may include materials, such as a composite of several different types of birefringent polymeric films alternately stacked in layers or a film utilizing the effect of circular dichroism of a cholesteric liquid crystal. Examples of the above reflective polarized light selecting devices are optical films, such as DBEF (product name) offered by the 3M Company or NIPOCS offered by Nitto Denko Co., Ltd.

The reflective polarized light selecting devices reflect light linearly polarized in a predetermined direction while transmitting light linearly polarized in a direction that intersects the reflected polarized light. The two reflective polarized light selecting devices may be arranged so that their reflective polarization axes intersect each other. These reflective polarized light selecting devices that selectively reflect or transmit light according to the direction of their polarization axes may be used. In such a case, by arranging the reflective polarization axes of the reflective polarized light selecting devices to intersect each other (preferably at a 90° angle), the reflected light from one of the reflective polarized light selecting devices may be efficiently transmitted through the other reflective polarized light selecting device.

Furthermore, the reflective polarized light selecting devices, which selectively polarize light based on the difference in the direction of the polarization axis, may have an absorptive polarized light selecting device that absorbs the polarized light with a polarization axis in a predetermined direction (also referred to as the absorptive polarization axis) while transmitting the polarized light with a polarization axis intersecting the absorbed polarized light (also referred to as the transmissive polarization axis). This absorptive polarized light selecting device is interposed between the reflective polarized light selecting devices and the transmissive polarization axis rotating devices. In such a case, the reflective polarization axis of the respective reflective polarized light selecting device and the transmissive polarization axis of the respective absorptive polarized light selecting device may be arranged so that they intersect each other. In other words, at the absorptive polarized light selecting devices, by once again selectively polarizing the light polarized at the reflective polarized light selecting devices, the polarization selectivity of the transmissive polarization axis rotating devices for the incident light becomes higher, enhancing the display quality of the light emitted from the transmissive polarization axis rotating devices. In particular, since the absorptive polarized light selecting device generally has a higher polarization selectivity in comparison to the reflective polarized light selecting devices, interposing the absorptive polarized light selecting device between the reflective polarized light selecting devices and the transmissive polarization axis rotating devices increases the polarization selectivity for the light entering the transmissive polarization axis rotating devices.

The reflective polarized light selecting devices may be reflective circularly polarized light selecting devices including a cholesteric liquid crystal, which utilizes the effect of circular dichroism to reflect the circularly polarized light with a predetermined rotative direction while transmitting the circularly polarized light with the opposite rotative direction. In this case, the two reflective polarized light selecting devices (the reflective circularly polarized light selecting devices) should be arranged so that they each reflect circularly polarized light with the same rotative direction.

The reflective circularly polarized light selecting devices including a cholesteric liquid crystal reflect and rotate the rotative direction of the circularly polarized light that enters with a predetermined rotative direction (a first rotative direction) while transmitting the circularly polarized light that enters with a different rotative direction (a second rotative direction). In the present invention, the rotative direction of the light is determined based on the direction in which the light travels.

Thus, by arranging two of the above reflective circularly polarized light selecting devices so that they both reflect the circularly polarized light having the same rotative direction (for example, they both may reflect the circularly polarized light with the first rotative direction), the circularly polarized light with the first rotative direction is reflected at one of the reflective circularly polarized light selecting devices and its rotative direction is converted into the second rotative direction. Then this polarized light is transmitted through the other reflective circularly polarized light selecting device and may be emitted to the transmissive polarization axis rotating devices.

More specifically, by using two reflective circularly polarized light selecting devices that each reflect circularly polarized light with the same rotative direction, the light reflected at one of the reflective circularly polarized light selecting devices may be transmitted through the other reflective circularly polarized light selecting device, as described above.

For the above reflective circularly polarized light selecting devices, a $\lambda/4$ retardation film is interposed between the reflective circularly polarized light selecting devices and the transmissive polarization axis rotating devices to convert the circularly polarized light with a predetermined rotative direction that has been transmitted through the reflective circularly polarized light selecting devices into linearly polarized light that is parallel to the transmissive polarization axis of the transmissive polarization axis rotating devices. Then, this linearly polarized light is selectively emitted while its polarization axis is rotated at the transmissive polarization axis rotating devices.

Disposing a scatterer between the reflective polarized light selecting devices and the absorptive polarized light selecting device suppresses the reflection at the front surface of the reflective polarized light selecting devices, and, thus, specular reflection is reduced or prevented.

The illumination device includes a light source and a light guiding plate, which guides the light from the light source. Each of the two transmissive polarization axis rotating devices is illuminated with light from both sides of the light guiding plate. The illumination device has a simple structure to effectively shine light onto each of the transmissive polarization axis rotating devices.

The illumination device may include a transparent planar light source. This illumination device is much simpler compared to the above illumination device, and may effectively shine light onto each of the transmissive polarization axis rotating devices.

The birefringence of the light guiding plate should preferably be about zero. In this case, among the light emitted from the light guiding plate, the polarized light reflected back from one of the above reflective polarized light selecting devices is transmitted through the light guiding plate while maintaining its state of polarization. Consequently, this polarized light may be transmitted through the other reflective polarized light selecting device. As a result, the light is more efficiently used to provide a brighter display.

By using a light guiding plate with a birefringence of $\lambda/2$, the slow axis of the light guiding plate may be arranged so that it forms an angle of about 45° with each of the reflective polarization axes of each of the two reflective polarized light selecting devices. Since the slow axis of the light guiding plate forms an angle of about 45° with each of the reflective polarization axes of each of the two reflective polarized light selecting devices, the phase of the linearly polarized light, which was a part of the light emitted from the light guiding plate, reflected back from either of the reflective polarized light selecting devices may be shifted by $\lambda/2$, causing the direction of the linearly polarized light to be rotated by 90°. As a result, even if the reflective polarization axis of each of the two reflective polarizers is disposed parallel to each other, the light reflected at one of the reflective polarization light selecting devices will definitely be transmitted through the other reflective polarized light selecting device.

To address or solve the above, the display unit according to the present invention has two liquid crystal panels, a lighting unit which illuminates both liquid crystal panels and which is interposed between the two liquid crystal panels, and two reflective polarizers, each interposed between the lighting unit and each of the two liquid crystal panels. In other words, the above transmissive polarization axis rotating devices are composed of liquid crystal panels to form a thinner display unit (a thinner liquid crystal display unit). In this case, each of the two reflective polarizers reflects light polarized in a predetermined direction while transmitting light polarized in the direction that intersects the reflected polarized light. The two reflective polarizers should preferably be arranged so that the reflective polarization axis of each of the reflective polarizers intersects each other.

The electronic apparatus according to the present invention includes the above display unit. This electronic apparatus has low electric power consumption and a simple and easy structure that allows images to be displayed on both the front and the rear surfaces. Furthermore, the displays on both surfaces are bright.

DETAILED DESCRIPTION OF PREFERRED EMBODIMENTS

Figure 1:
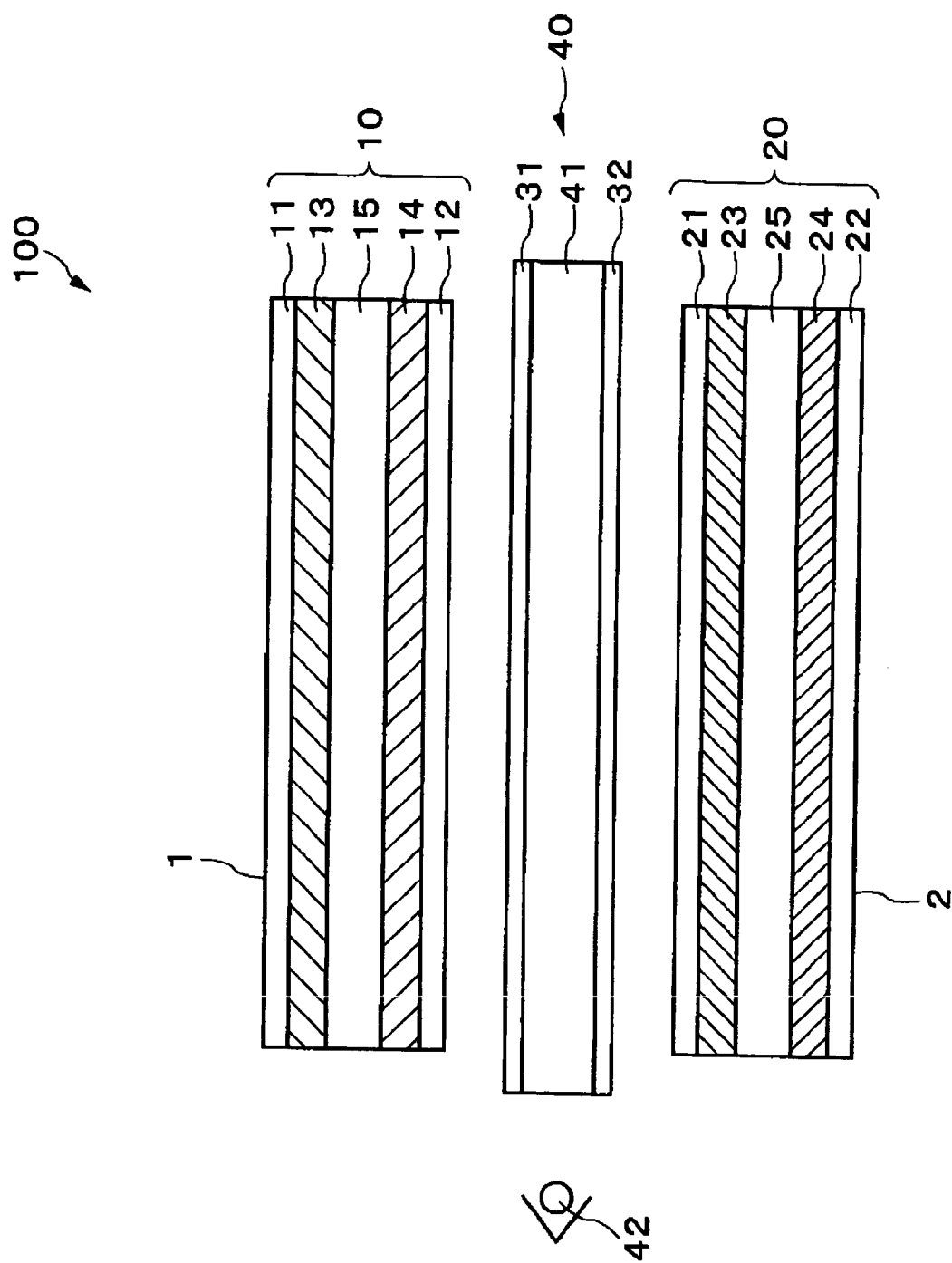
FIG. 1 is a cross-sectional view of the general structure of a liquid crystal display unit according to a first exemplary embodiment of the present invention.

Exemplary embodiments of the present invention are described below by referring to the drawings. To make the drawings describing the exemplary embodiments more easily viewable, the film thickness and the dimensional ratio of each component included in the drawings are not drawn to represent the actual dimensions.

[First Exemplary Embodiment]

Figure 2:
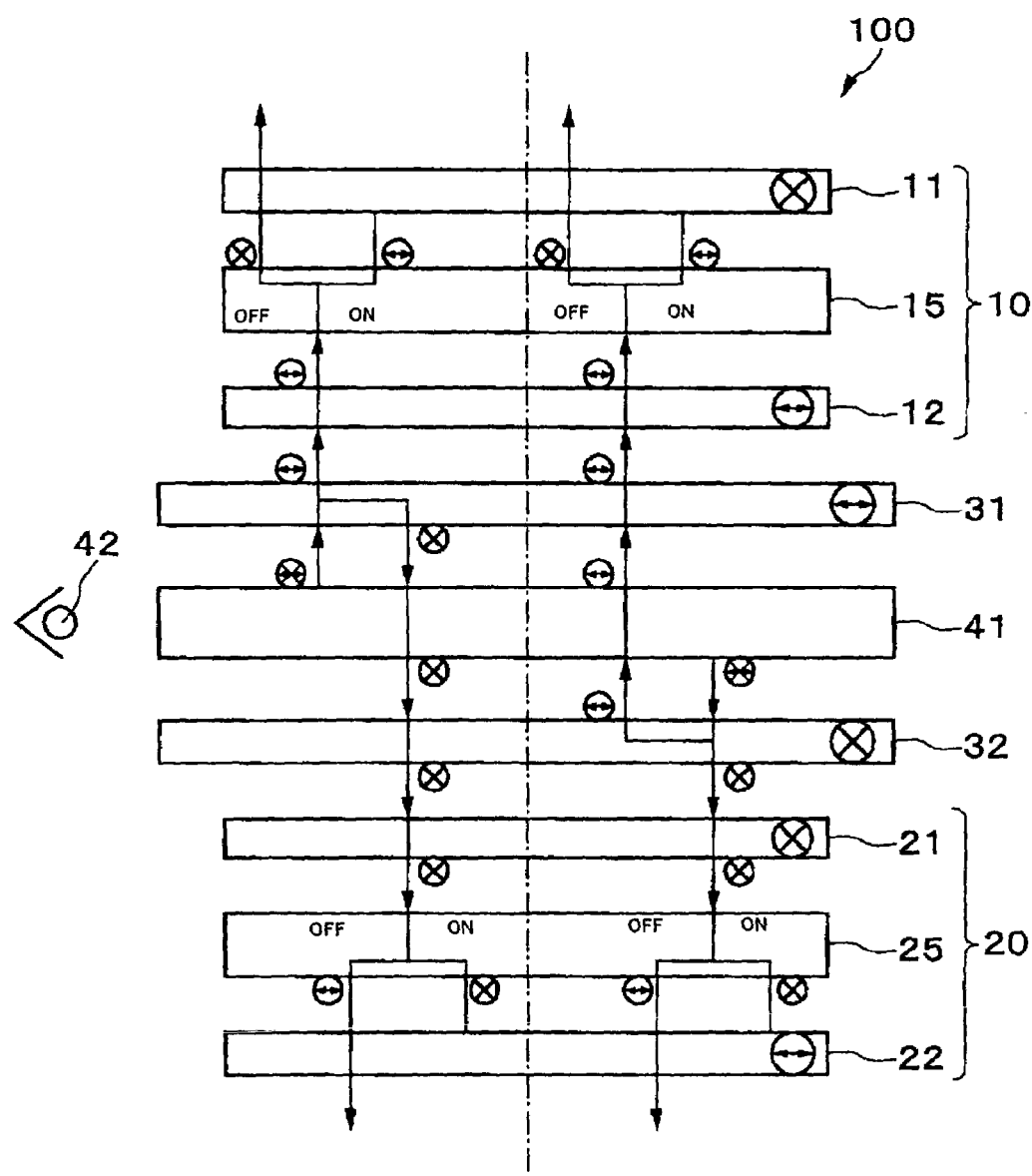
FIG. 2 is a schematic showing the display mechanism of the liquid crystal display unit of FIG. 1.

FIG. 1 is a cross-sectional view of the general structure of a liquid crystal display unit according to a first exemplary embodiment of the present invention. FIG. 2 illustrates the display mechanism and includes only the components necessary for the description.

Referring to FIG. 1, a liquid crystal display unit 100, which is an exemplary embodiment according to the present invention, includes a pair of liquid crystal cells 10 and 20 and a backlight (lighting unit) 40 used for the liquid crystal cells 10 and 20. The liquid crystal display unit 100 displays images on the front and the rear surfaces by emitting light transmitted from the backlight 40 via the liquid crystal cells 10 and 20 onto display surfaces 1 and 2. In the liquid crystal cell 10 (20), an upper substrate 13 (24) and a lower substrate 14 (23) are disposed so that they face each other. In the space between the upper substrate 13 (24) and the lower substrate 14 (23), a liquid crystal layer 15 (25) composed of liquid crystal sealed therein is interposed. The liquid crystal layers 15 (25) of the liquid crystal cells 10 and 20 function as a transmissive polarization axis rotating device to vary the polarization axis of the transmitted light. The liquid crystal is a TN liquid crystal with a 90° twist angle. In the descriptions of the exemplary embodiments of the present invention, the backlight-40-sides of the liquid crystal cells 10 and 20 are referred to as the "inner" sides (rear sides) and the opposite sides are referred to as the "outer" sides (front sides).

The backlight 40 is an illumination device disposed adjacent to the inner sides of the liquid crystal cells 10 and 20. The backlight 40 includes a light source 42, which is composed of a component, such as a cold-cathode tube or an LED, and a light guiding plate 41. The liquid crystal cells 10 and 20 may be irradiated with light from the longitudinal sides (the sides facing the liquid crystal cells 10 and 20) of the light guiding plate 41. An organic EL light, for example, may be used as the light source for the backlight 40 allowing light to be emitted from both sides of the backlight 41. In this case, since the organic EL light is a planar light source, it is not necessary to provide complex designs and/or processes to uniformly irradiate the front and the rear surfaces of the light guiding plate 41 with light emitted from the lateral side.

Also, moiré patterns caused by interference with the patterns of the light guiding plate do not occur frequently. Preferably, the light guiding plate 41 should be composed of a material with a small birefringence such as acrylic resin, PC resin, or polyolefin resin so that the state of polarization of the reflected polarized light is not altered easily.

Reflective polarizers 31 and 32, which are reflective polarized light selecting means, are disposed between each of the two liquid crystal cells 10 and 20 and the light guiding plate 41. The reflective polarizers 31 and 32 reflect light linearly polarized in a predetermined direction while transmitting light linearly polarized in the direction intersecting the reflected polarized light. In this exemplary embodiment, the reflective polarization axes of the two reflective polarizers 31 and 32 intersect each other.

An absorbing polarizer 11 (22) is disposed on the outer side of the liquid crystal cell 10 (20), and, similarly, an absorbing polarizer 12 (21) is disposed on the backlight-40-side (the inner side) of the liquid crystal cell 10 (20). In this case, the transmissive polarization axis of the absorbing polarizer 11 (22) is arranged in a direction substantially equal to the direction of the transmissive polarization axis of the reflective polarizer 31 (32).

Within the liquid crystal cell 10 (20), pixel electrodes (not shown in the drawings), which are composed of transparent conductive films such as indium tin oxide (ITO), are disposed on the inside of the lower substrate 14 (23), which is composed of a transparent material such as glass or plastic. An alignment film (not shown) composed of polyimide or the like is deposited to cover the pixel electrode. In this exemplary embodiment, the lower substrate 14 (23) is composed of a device substrate with pixel switching elements such as TFTs, data lines, and scanning lines. In FIG. 1, however, the pixel switching elements, data lines, and scanning lines are not shown.

Alternatively, on the inside of the upper substrate 13 (24), which is composed of a transparent material, such as glass or plastic, a common electrode (not shown in the drawings) composed of a transparent conductive film such as indium tin oxide (ITO), and an alignment film (also not shown in the drawings) composed of polyimide or the like are stacked in sequence.

The alignment film on the upper substrate 13 (24) and the lower substrate 14 (23) are processed by methods for a horizontal alignment, such as rubbing. The alignment direction of each alignment film for the upper substrate 13 (24) and the lower substrate 14 (23) intersect each other. The liquid crystal interposed between the upper and lower substrates is twisted by 90°. Applying a selective voltage (or turning the voltage on), aligns the molecules of the liquid crystal layer 15 which are disposed between the upper substrate 13 (24) and the lower substrate 14 (23), in a direction perpendicular to the surfaces of the substrates. In this exemplary embodiment, the TN mode with a 90° twist angle is described as an example. The liquid crystal mode, however, is not limited to TN liquid crystal mode, and other liquid crystal modes may be employed as well.

The inner absorbing polarizer 12 (21) and the outer absorbing polarizer 11 (22) are arranged so that the directions of their transmissive polarization axes intersect in the same way as the alignment directions of the above alignment films intersect. More specifically, as shown in FIG. 2, the transmissive polarization axis of the absorbing inner polarizer 12 (21) is substantially parallel to the alignment direction of the alignment film formed on the inside of the lower substrate 14 (23). At the same time, the axis is substantially parallel to the transmissive polarization axis of the reflective polarizer 31 (32). On the other hand, transmissive polarization axis of the outer absorbing polarizer 11 (22) intersects (preferably at a 90° angle) the transmissive polarization axis of the inner absorbing polarizer 12 (21).

The display mechanism of the liquid crystal display unit 100 of this exemplary embodiment is described below by referring to FIG. 2. As shown on the left side in FIG. 2, the light emitted from the light guiding plate 41 to the first liquid crystal cell 10 (the front liquid crystal cell 10) is selectively polarized at the front reflective polarizer 31. In other words, polarized light (first polarized light) with a polarization axis parallel to the transmissive polarization axis (parallel to the page) of the reflective polarizer 31 is transmitted through the reflective polarizer 31, whereas polarized light (second polarized light) with a polarization axis parallel to the reflective polarization axis (perpendicular to the page) of the reflective polarizer 31 is reflected at the reflective polarizer 31.

The first polarized light transmitted through the reflective polarizer 31 is then transmitted through the absorbing polarizer 12 (whose transmissive polarization axis is parallel to the page) on the inner side of the liquid crystal cell 10. Subsequently, the first polarized light enters the liquid crystal layer 15, where its polarization axis is rotated according to the application of a selective voltage. When the selective voltage is not applied (or when the voltage is off), the first polarized light is transmitted through the liquid crystal layer 15 and its polarization axis is rotated. Then, it is further transmitted through the outer absorbing polarizer 11 (whose transmissive polarization axis is perpendicular to the page), causing the front display surface (a first display surface) to be bright (or white). Conversely, when the selective voltage is applied (or when the voltage is on), the first polarized light is transmitted through the liquid crystal layer 15 without its polarization axis being rotated, but then it is absorbed by the outer absorbing polarizer 11, causing the display to be dark (or black).

The second polarized light reflected at the reflective polarizer 31 is transmitted through the light guiding plate 41 and then enters the rear reflective polarizer 32. Since, in this case, the light guiding plate 41 is composed of a material with a small birefringence (preferable with no birefringence), as mentioned above, the polarization axis of the second polarized light is not rotated as it is transmitted through the light guiding plate 41.

The reflective polarization axis of the rear reflective polarizer 32 is set to intersect the reflective polarization axis of the front reflective polarizer 31. Therefore, the second polarized light that enters the rear reflective polarizer 32 is transmitted through this reflective polarizer 32 and then transmitted through the inner absorbing polarizer 21 of the second liquid crystal cell 20 (the rear liquid crystal cell) to enter the liquid crystal layer 25. At this liquid crystal layer 25, the polarization axis is rotated according to the application of the selective voltage. When the selective voltage is not applied (or when the voltage is off), the second polarized light is transmitted through the liquid crystal layer 25 and its polarization axis is rotated. Then it is transmitted through the outer absorbing polarizer 22, (whose transmissive polarization axis is parallel the page), causing the rear display surface (a second display surface) to be bright (or white). Conversely, when the selective voltage is applied (or when the voltage is on), the second polarized light is transmitted through the liquid crystal layer 25 without its polarization axis being rotated, but then it is absorbed by the outer absorbing polarizer 22, causing the display to be dark (or black).

Similarly, as shown on the right side in FIG. 2, the light emitted from the light guiding plate 41 to the rear liquid crystal cell 20 is also selectively polarized at the rear reflective polarizer 31. The light transmitted through the reflective polarizer 32 is third polarized light, and the light reflected at the reflective polarizer 32 is fourth polarized light. The transmitted third polarized light can be emitted to the rear display surface (the second display surface) via the liquid crystal cell 20. Furthermore, the reflected fourth polarized light can be emitted to the front display surface (the first display surface) via the front reflective polarizer 31 and the liquid crystal cell 10. Consequently, images can be displayed on both the front and the rear surfaces of the display unit.

As described above, in this exemplary embodiment, the polarized light reflected at one of the reflective polarizers (for instance, the reflective polarizer 31) may be transmitted through the other reflective polarizer (for instance, the reflective polarizer 32). As a result, the light utilization efficiency is enhanced, and the brightness of the front and the rear surfaces of the liquid crystal panel increases. Moreover, since two liquid crystal panels may be illuminated with one light guiding plate, the liquid crystal display unit becomes thin, and the number of parts necessary for the unit may be reduced.

[Second Exemplary Embodiment]

In this exemplary embodiment, the birefringence of the light guiding plate 41 was about zero. Alternatively, the birefringence of the light guiding plate 41 may be $\lambda/2$, while the slow axis of the light guiding plate 41 may form an angle of about 45° with the reflective polarization axis of each of the reflective polarizers 31 and 32. Moreover, the reflective polarization axis of each of the reflective polarizers 31 and 32 may be parallel to each other. When the linearly polarized light, which was part of the light emitted from the light guiding plate 41 and which was reflected back from either one of the reflective polarizers 31 and 32, is transmitted through the light guiding plate 41, whose slow axis, as described above, intersects the reflective polarization axis of each of the reflective polarizers 31 and 32 at 45°, the phase of the respective linearly polarized light is shifted by $\lambda/2$ and the direction of the polarization of the respective linearly polarized light is rotated by 90°. Since the reflective polarization axes of the reflective polarizers 31 and 32 are parallel, the linearly polarized light reflected at one of the reflective polarizers is rotated by 90° at the light guiding plate and becomes linearly polarized light that is perpendicular to the reflective axis of the other reflective polarizer (i.e., parallel to the transmissive axis). As a result, the reflected polarized light is assured to be transmitted through the other reflective polarizer. As described here, by controlling the birefringence of the light guiding plate and the directions of the axes, the angle of the reflective polarization axis of each reflective polarizer may be rotated by 90°.

[Third Exemplary Embodiment]

Figure 3:
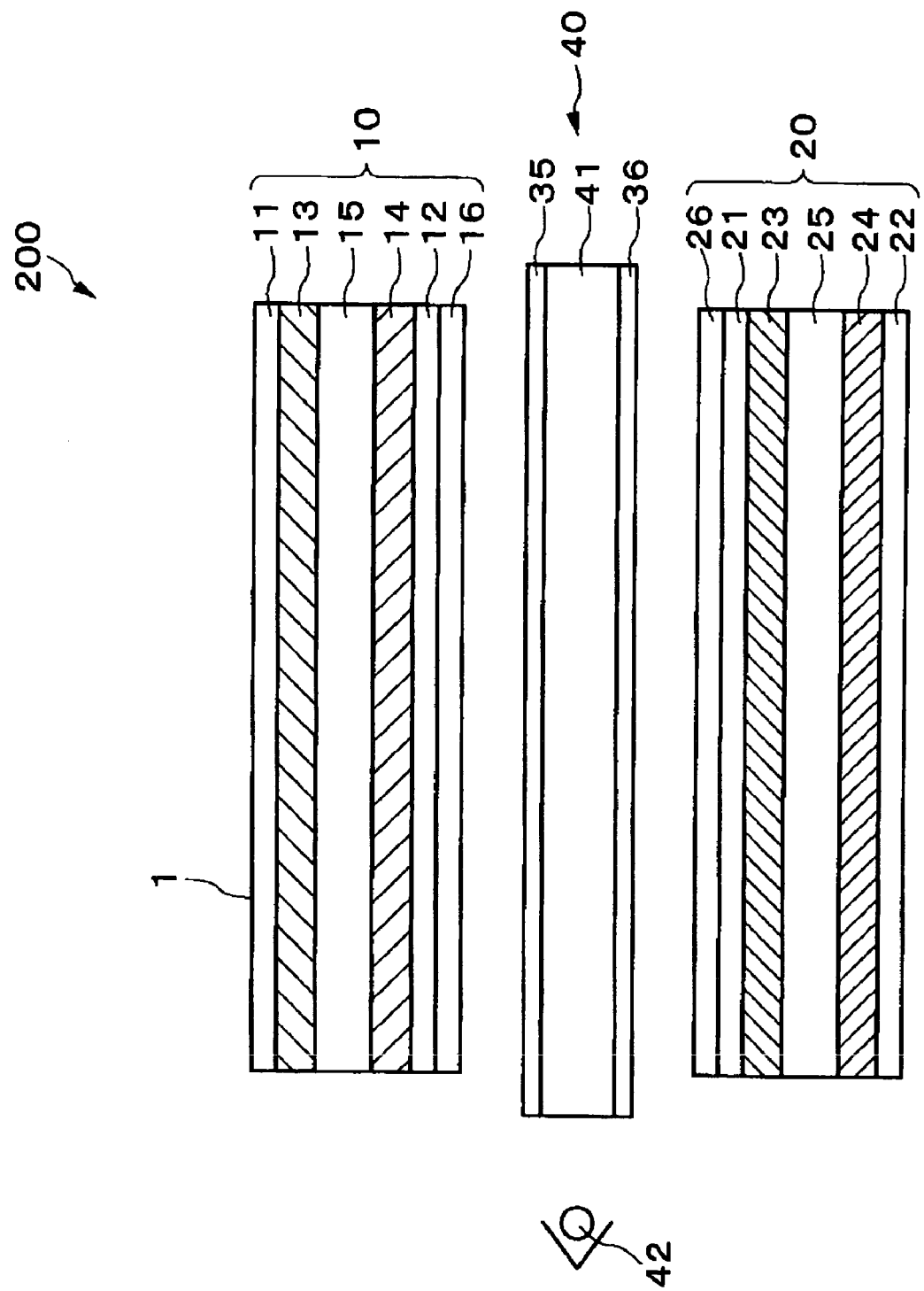
FIG. 3 is a cross-sectional view of the general structure of a liquid crystal display unit according to a third exemplary embodiment of the present invention.
Figure 4:
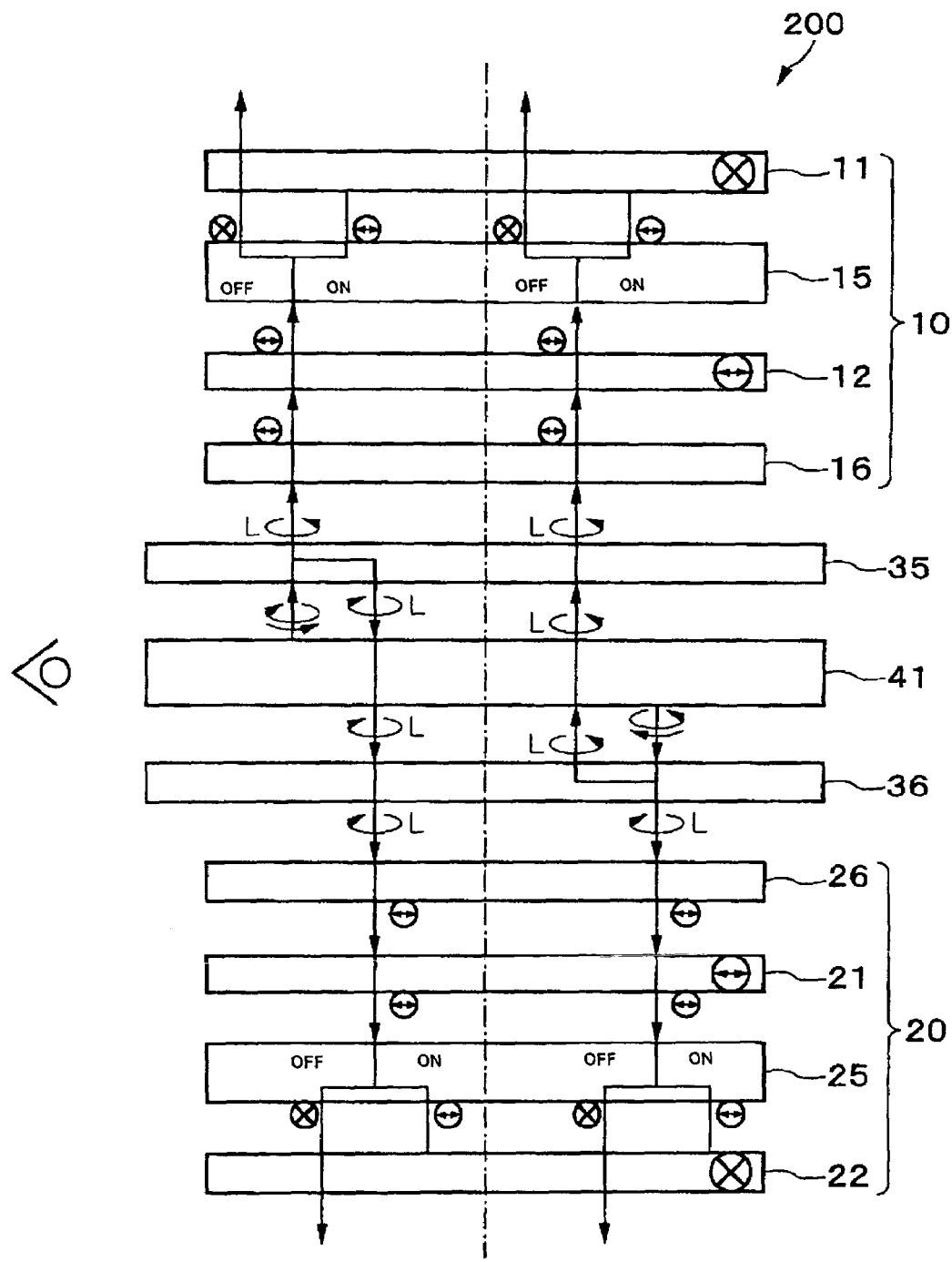
FIG. 4 is a schematic showing the display mechanism of the liquid crystal display unit of FIG. 3.

FIG. 3 is a cross-sectional view of the overall structure of the liquid crystal display unit as a third exemplary embodiment. FIG. 4 shows its display mechanism and shows only the components necessary for the description. For components that are indicated by the same reference numerals as the liquid crystal display unit 100 of the first exemplary embodiment shown in FIG. 1, the structures of these components are the same as the ones shown in FIG. 1 unless otherwise stated.

Similar to the first exemplary embodiment in FIG. 1, the liquid crystal display unit 200, as shown in FIG. 3, includes two liquid crystal cells 10 and 20 and a backlight (lighting unit) 40 used for the liquid crystal cells 10 and 20. The liquid crystal display unit 200 displays images on both the front and the rear surfaces by emitting light transmitted from the backlight 40 via the liquid crystal cells 10 and 20 onto the display surfaces 1 and 2.

Reflective polarizers 35 and 36, which are reflective polarized light selecting devices, are each interposed between the backlight 40 and each of the liquid crystal cells 10 and 20, respectively. The reflective polarizers 35 and 36 are composed of cholesteric liquid crystal. These polarizers reflect circularly polarized light rotating in a predetermined direction, while transmitting circularly polarized light rotating in the opposite direction. In this exemplary embodiment, both of the reflective polarizers 35 and 36 are set to reflect the circularly polarized light rotating in the same rotative direction. More specifically, the circularly polarized light reflected at the reflective polarizer 35 may be transmitted through the other reflective polarizer 36.

On the inner side of the liquid crystal cell 10 (20), i.e., on the inner side of the absorbing polarizer 12 (21), a λ/4 retardation film 16 (26) is disposed. The retardation axis of the λ/4 retardation film 16 (26) is arranged so that the circularly polarized light, after being transmitted through the λ/4 retardation film 16 (26), becomes linearly polarized light that may be transmitted through the absorbing polarizer 12 (21).

In the below, the display mechanism of the liquid crystal display unit 200 according to this exemplary embodiment is described by referring to FIG. 4. The rotative directions of the circularly polarized light are the rotative directions viewed from the direction opposite to that in which the light travels.

As shown on the left in FIG. 4, the light emitted from the light guiding plate 41 to the first liquid crystal cell 10 (the front liquid crystal cells 10) is selectively polarized at the front reflective polarizer 35. More specifically, at the reflective polarizer 35, the left-circularly-polarized light (first polarized light) is transmitted through the reflective polarizer 35, while the right-circularly-polarized light (second polarized light) is reflected at the reflective polarizer 35. After being reflected, the reflected circularly polarized light becomes left-circularly-polarized light (third polarized light).

After the first polarized light is transmitted through the reflective polarizer 35, it is transmitted through the λ/4 retardation film 16 disposed on the inner side of the liquid crystal cell 10 and becomes linearly polarized light with a polarization axis parallel to the page. This linearly polarized light is further transmitted through the absorbing polarizer 12 (whose transmissive polarization axis is parallel to the page) and then enters the liquid crystal layer 15. At the liquid crystal layer 15, the polarization axis is rotated according to the application of the selective voltage. When the selective voltage is not applied (or when the voltage is off), the first polarized light is transmitted through the liquid crystal layer 15 and its polarization axis is rotated. Then it is transmitted through the outer absorbing polarizer 11 (whose transmissive polarization axis is perpendicular to the page), causing the front display surface (a first display surface) to be bright (or white). Conversely, when the selective voltage is applied (or when the voltage is on), the first polarized light is transmitted through the liquid crystal layer 15 without its polarization axis being rotated, but then it is absorbed by the outer absorbing polarizer 11, causing the display to be dark (or black).

The second polarized light reflected at the reflective polarizer 35 is transmitted through the light guiding plate 41 and then enters the rear reflective polarizer 36. Since the light guiding plate 41 is composed of a material with a small birefringence (preferably with no birefringence), as mentioned above, the rotative direction of the circularly polarized light is not altered when it is transmitted through the light guiding plate 41.

The rear reflective polarizer 36 is arranged so that the rotative direction of the reflective light intersects the rotative direction of the light reflected at the front reflective polarizer 35. Thus, the second polarized light that entered the rear reflective polarizer 36 is transmitted through the reflective polarizer 36 and then through the λ/4 retardation film 26 disposed on the inner side of the second liquid crystal cell 20 (the rear liquid crystal cell). At the λ/4 retardation film 26, the second polarized light is converted into linearly polarized light with a polarization axis parallel to the page. This linearly polarized light is further transmitted through the absorbing polarizer 21 (whose transmissive polarization axis is parallel to the page) and enters the liquid crystal layer 25. At this liquid crystal layer 25, the polarization axis is rotated according to the application of the selective voltage.

When the selective voltage is not applied (or when voltage is off), the second polarized light is transmitted through the liquid crystal layer 25 and its polarization axis is rotated. Then, it is transmitted through the outer absorbing polarizer 22 (whose transmissive polarization axis is perpendicular to the page), causing the rear display surface (a second display surface) to be bright (or white). Conversely, when the selective voltage is applied (or when the voltage is on), the second polarized light is transmitted through the liquid crystal layer 25 without its polarization axis being rotated, but then it is absorbed by the outer absorbing polarizer 22, causing the display to be dark (or black).

The light emitted from the light guiding plate 41 to the rear liquid crystal cell 20 is also selectively polarized at the rear reflective polarizer 36, as in the right side in FIG. 2. Left-circularly-polarized light (the third polarized light) is transmitted through the reflective polarizer 36, while right-circularly-polarized light (fourth polarized light) is reflected at the reflective polarizer 36. This reflected light becomes left-circularly-polarized light (the first polarized light).

The third polarized light that is transmitted through the reflective polarizer 36 may be emitted onto the rear display surface (the second display surface) via the liquid crystal cell 20. The reflected first polarized light may be emitted onto the front display surface (the first display surface) via the front reflective polarizer 35 and the liquid crystal cell 10. As a result, images may be displayed on both the front and the rear surfaces.

As described above, this exemplary embodiment also includes reflective polarizers that are composed of a cholesteric liquid crystal utilizing the effect of dichroism of the circularly polarized light. By selectively polarizing the circularly polarized light according to its rotative direction, the polarized light reflected at one of the reflective polarizers (for instance, the reflective polarizer 35) may be transmitted through the opposite reflective polarizer (for instance, the reflective polarizer 36). As a result, light utilization efficiency is enhanced, and the brightness of the front and the rear surfaces of the panel increases. Moreover, since two liquid crystal panels may be illuminated with one light guiding plate, the liquid crystal display unit becomes thin, and the number of parts necessary for the unit may be reduced.

[Fourth Exemplary Embodiment]

Figure 5:
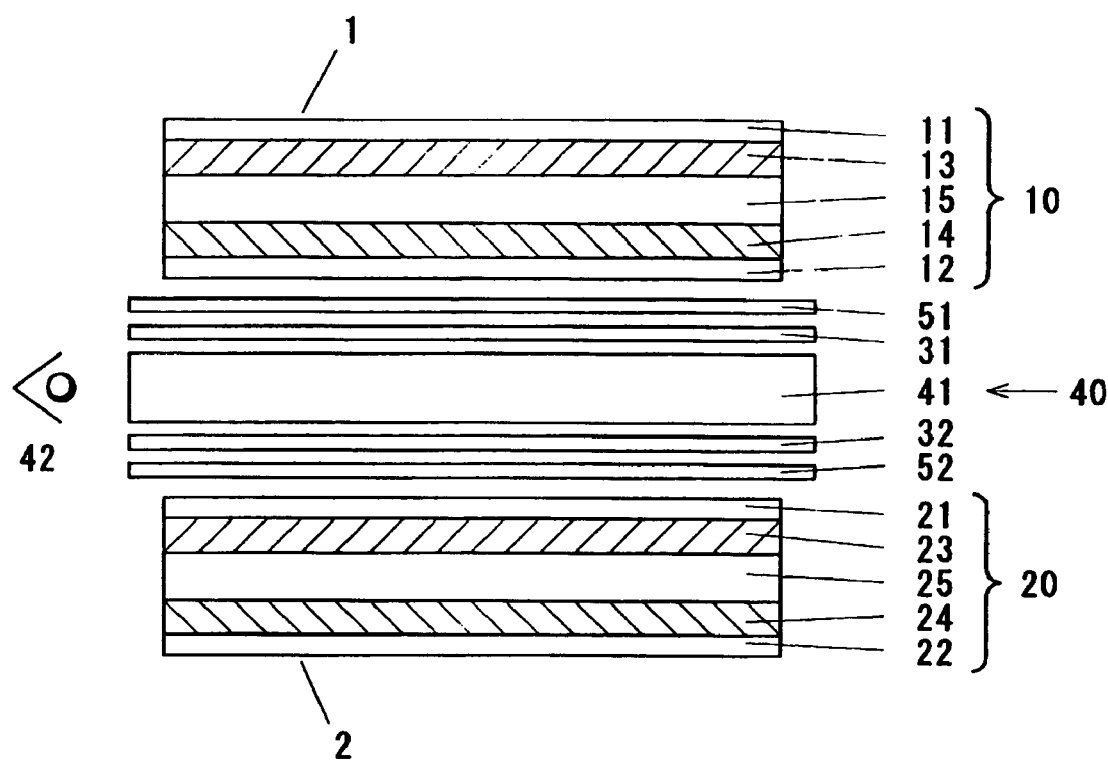
FIG. 5 is a cross-sectional view of the general structure of a liquid crystal display unit according to the fourth exemplary embodiment of the present invention.

FIG. 5 is a cross-sectional view of the overall structure of the liquid crystal display unit according to a fourth exemplary embodiment. The liquid crystal display unit has exactly the same structure as the first exemplary embodiment shown in FIG. 1, except that a scattering layer 51 (52) composed of a film with a roughened surface is interposed between the liquid crystal cell 10 (20) and the reflective polarizer 35 (36). Adopting this structure may reduce or prevent specular reflection at the reflective polarizers. Also, the roughened surfaces reduce or prevent the generation of Newton rings.

For this exemplary embodiment, a film with a roughened surface is used for the scattering layers 51 and 52. Instead, an adhesive scattering layer with an adhesive film including beads that function as scatterers may be used. By using this adhesive scattering layer, the liquid crystal cells 10 and 20 may be bonded to the reflective polarizers 31 and 32, respectively. As a result, in addition to the above mentioned effects, the entire liquid crystal display unit becomes even thinner. Also, displacement caused by vibration and/or shock, and/or entry of foreign materials may be reduced or prevented.

[Fifth Exemplary Embodiment]

Figure 6:
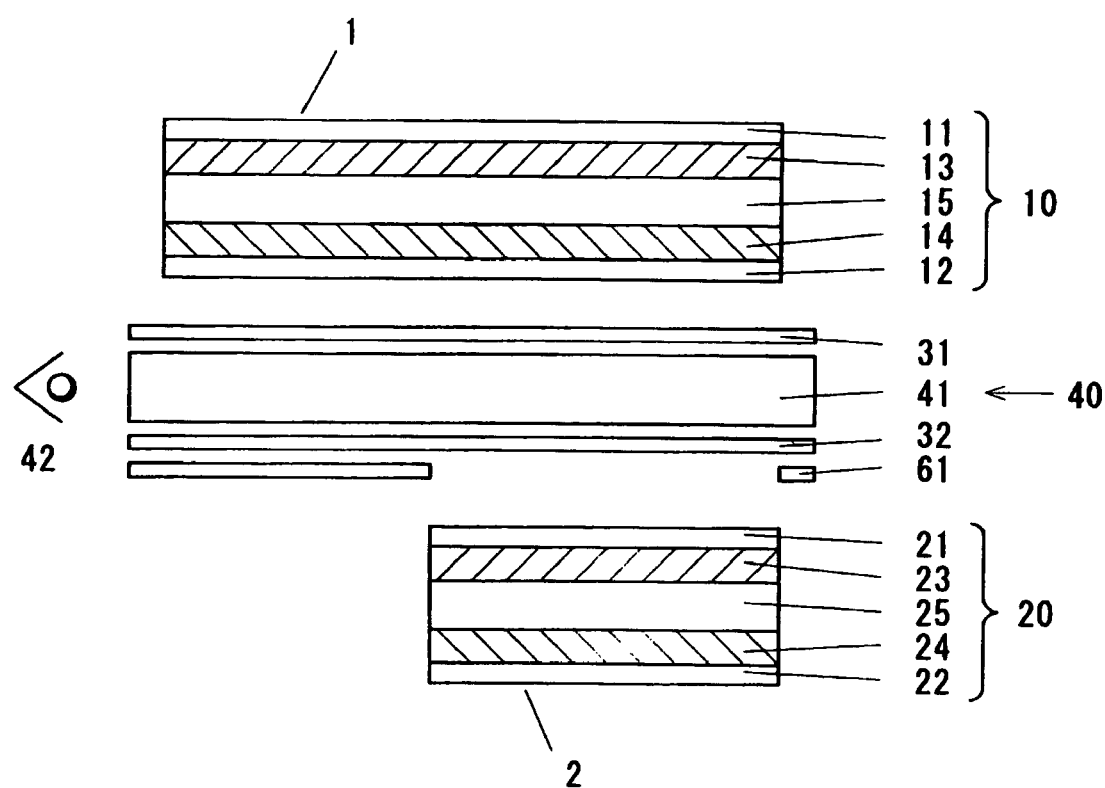
FIG. 6 is a cross-sectional view of the general structure of a liquid crystal display unit according to the fifth exemplary embodiment of the present invention.

FIG. 6 is a cross-sectional view of the overall structure of the liquid crystal display unit according to a fifth exemplary embodiment. As shown in FIG. 6, the sizes of the display areas of the liquid crystal cells 10 and 20 differ. In comparison with the size of the display area of the liquid crystal cell 10, the display area of the liquid crystal cell 20 is smaller. A light shielding layer 61 composed of a light absorbing material is interposed between the liquid crystal cell 20 and the reflective polarizer 32. Except for the size difference of the display areas, the structure of the liquid crystal display is exactly the same as the first exemplary embodiment shown in FIG. 1.

By adopting the above structure, degradation of the display quality caused by the shadow of the liquid crystal cell 20 visible from the liquid-crystal-cell-10-side of the display unit may be reduced.

[Sixth Exemplary Embodiment]

Figure 7:
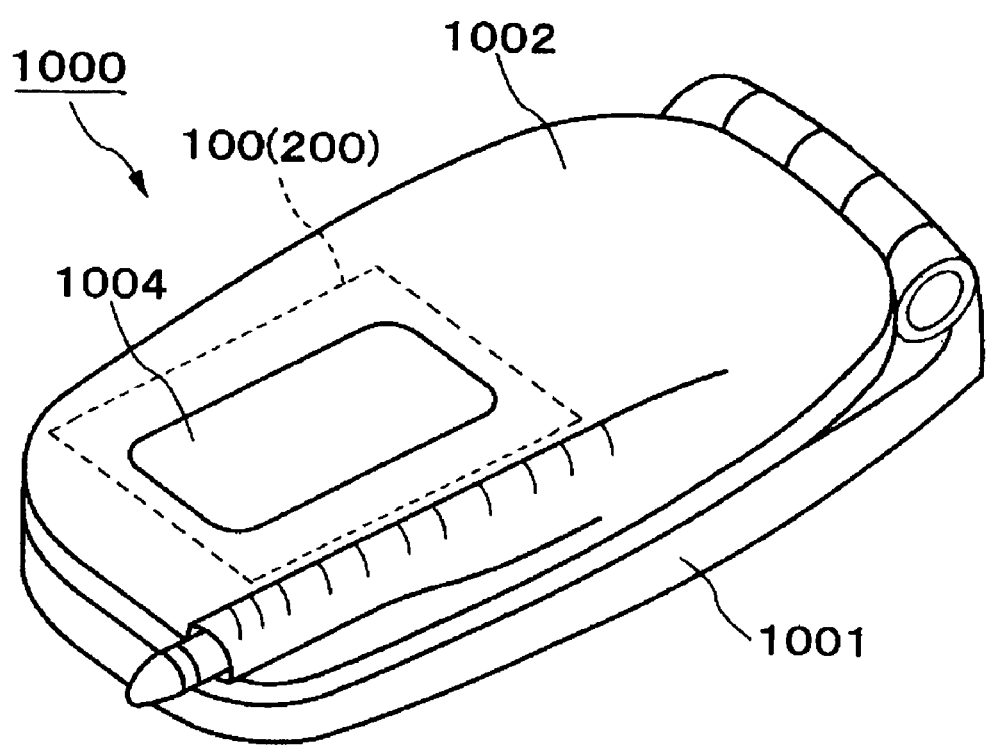
FIG. 7 is a perspective view of the folded state of the electronic apparatus according to a sixth exemplary embodiment of the present invention.
Figure 8:
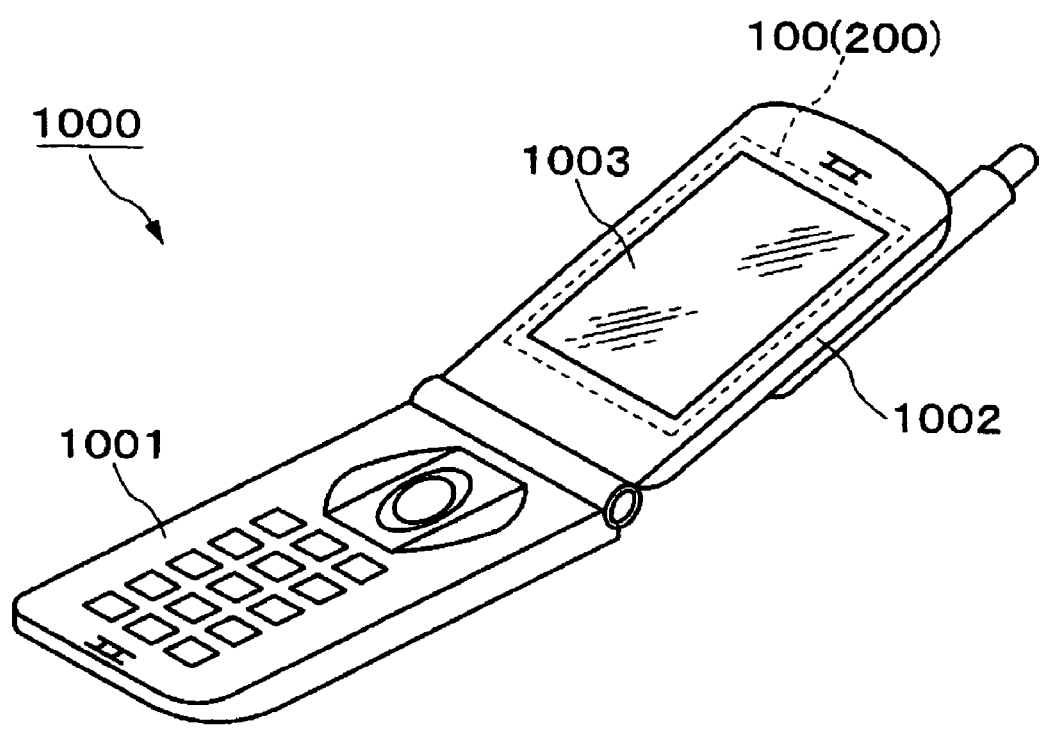
FIG. 8 is a perspective view of the extended state of the electronic apparatus of FIG. 7.

An electronic apparatus according to a sixth exemplary embodiment of the present invention is described by referring to FIGS. 7 and 8. A cellular phone 1000 is an exemplary embodiment of the electronic apparatus according to the present invention. The cellular phone 1000 is a foldable cellular phone that may take a folded state, as shown in FIG. 7, and an extended state, as shown in FIG. 8. The cellular phone 1000 includes a body 1001 and a display 1002.

The above liquid crystal display unit is disposed inside the display 1002. Display images are visible on the front display surface 1003 and the rear display surface 1004 on the display 1002. For this cellular phone 1000, bright display images become visible on the front display surface 1003 and/or the rear display surface 1004 in response to the various operations and different states of the apparatus, including, in particular, the change from the folded state to the extended state, and vice versa.

The liquid crystal display unit related to the display unit according to the present invention and the exemplary embodiment of the cellular phone related to the electronic apparatus according to the present invention are both described above. However, the present invention is not limited to the descriptions above and may be modified in various ways as long as the modifications do not deviate from the spirit of the present invention.

What is claimed is:

1. A display unit, comprising:
   two transmissive polarization axis rotating devices to vary the polarization axis of transmitted light;
   an illumination device disposed between the two transmissive polarization axis rotating devices to emit light to the two transmissive polarization axis rotating devices;
   two reflective polarized light selecting devices, each disposed between the illumination device and each of the two transmissive polarization axis rotating devices, the illumination device transmitting the reflected light from the two reflective polarized light selecting devices, the two reflective polarized light selecting devices reflecting light linearly polarized in a predetermined direction while transmitting light linearly polarized in a direction intersecting the reflected polarized light, and the reflective polarization axes of the two reflective polarized light selecting devices intersecting each other; and
   two absorptive polarized light selecting devices, to absorb light linearly polarized in a predetermined direction while transmitting light linearly polarized in a direction intersecting the absorbed polarized light, interposed between the respective reflective polarized light selecting devices and the respective transmissive polarization axis rotating devices, and each of the reflective polarization axis of the reflective polarized light selecting devices and each of the transmissive polarization axes of the absorptive polarized light selecting devices intersecting each other.

2. The display unit according to claim 1, each of the reflective polarized light selecting devices including a cholesteric liquid crystal and reflecting circularly polarized light with a predetermined rotative direction while transmitting circularly polarized light with the opposite rotative direction, and each of the two reflective polarized light selecting devices reflecting circularly polarized light with the same rotative direction.

3. The display unit according to claim 2, further including a λ/4 retardation film interposed between each of the two reflective polarized light selecting devices and each of the two transmissive polarization axis rotating devices to vary the polarization axis of the transmitted light.

4. The display unit according to claim 1, further including scatterers disposed between each of the two reflective polarized light selecting devices and each of the two absorptive polarized light selecting devices.

5. The display unit according to claim 1, the illumination device including a transparent planar light source.

6. The display unit according to claim 1, the light guiding plate having a birefringence of about zero.

7. An electronic device, comprising: the display unit according to claim 1.

8. A display unit, comprising:
   two transmissive polarization axis rotating devices to vary the polarization axis of transmitted light;
   an illumination device disposed between the two transmissive polarization axis rotating devices to emit light to the two transmissive polarization axis rotating devices; and
   two reflective polarized light selecting devices, each disposed between the illumination device and each of the two transmissive polarization axis rotating devices, the illumination device transmitting the reflected light from the two reflective polarized light selecting devices,
   the illumination device having a light source and a light guiding plate to guide light from the light source and emitting the light from both sides of the light guiding plate to the transmissive polarization axis rotating devices, and the birefringence of the light guiding plate being λ/2, and the angle formed by the slow axis of the light guiding plate and the reflective polarized light selecting devices being about 45°.

9. A display unit, comprising:

two liquid crystal panels;

a lighting unit interposed between the liquid crystal panels to emit light to each liquid crystal panel;

a first reflective polarizer interposed between the lighting unit and one of the liquid crystal panels;

a second reflective polarizer interposed between the lighting unit and another of the liquid crystal panels;

a first absorptive polarizer interposed between the one of the liquid crystal panels and the first reflective polarizer; and a second absorptive polarizer interposed between the other of the liquid crystal panels and the second reflective polarizer.

10. The display unit according to claim 9, each of the two reflective polarizers reflecting light linearly polarized in a predetermined direction while transmitting light linearly polarized in the direction intersecting the reflected polarized light, and the polarization axes of the two reflective polarizers intersecting each other.

* * * * *